July 19, 1966  L. A. MASSAGLIA  3,261,046

MEAT CLEANING MACHINE

Filed Oct. 26, 1964  2 Sheets-Sheet 1

LEONDRO A. MASSAGLIA
INVENTOR

Huebner & Worrel
ATTORNEYS

July 19, 1966  L. A. MASSAGLIA  3,261,046
MEAT CLEANING MACHINE

Filed Oct. 26, 1964  2 Sheets-Sheet 2

LEONDRO A. MASSAGLIA
INVENTOR

Huebner & Worrel
ATTORNEYS

3,261,046
MEAT CLEANING MACHINE

Leondro A. Massaglia, Daly City, Calif., assignor of one-half to said Massaglia, one-fourth to Joseph Kusber, and one-fourth to Leo Kusber, co-partners under the firm name of Kusber Manufacturing Company, Daly City, Calif.
Filed Oct. 26, 1964, Ser. No. 406,459
5 Claims. (Cl. 15—3.1)

This invention relates to a meat cleaning machine and more particularly to a machine for conveniently and effectively brushing refuse particles from freshly cut meat while effecting continuous removal of the particles from the brushing area as well as from the brushing elements and collecting the particles for convenient disposal.

In the preparation of fresh cuts of meat for marketing, it has been known to use rotary brushes for cleaning refuse particles such as bone, marrow and fat dust from the meat cuts. Such refuse commonly results from the accumulation of particles during power saw cutting of the meat for packaging. While no prior art is known to anticipate the instant invention, an investigation reveals the following patents to be representative of such art: K. H. Scott, 2,799,877, July 23, 1957; J. L. Smith, 2,826,772, March 18, 1958; K. H. Scott, 2,932,042, April 12, 1960.

Although Scott provides a machine allowing application of meat surfaces to a single rotating brush, the grill on his cover plate creates spaces along which there is no brush contact with the meat and, as a result, uniformly thorough cleaning of the meat surface is practically impossible without time-consuming re-applications. Smith's apparatus affords a remedy for this shortcoming but only through use of a substantially limited brushing surface which affords only minimal cleaning at a lesser operative efficiency than desirable. Furthermore, although Smith shows the use of a pair of adjacent brush elements, no apparent advantage is realized through any cooperative interaction by the brushes due to a closer spacing.

In the use of such meat cleaning machines it has been found desirable to have a means for maintaining the brushes in a clean condition, the more effectively and sanitarily to allow the brush bristles to clean the meat cuts. Although both Scott and Smith show the use of bristle scrapers and refuse pans disposed beneath the brushes in a particular structural arrangement adapted to their respective devices, it is not obvious how these elements would be adapted for effective use with other types of more effective and sophisticated brush combinations.

Therefore, it is an object of the present invention to provide a meat cleaning machine affording effective brushing contact across the entire extent of a cut of meat without leaving gaps of uncleaned area.

Another object is to provide such a machine having a removable refuse pan for collecting the refuse particles removed from the meat.

Another object is to provide such a machine having at least two rotating cooperatively inter-acting sets of annular brushes disposed in overlapping juxtaposition and projecting above a meat support surface a predetermined optimum distance for meat cleaning.

Another object is to provide such a machine having a brush cleaning member which engages the brushes and dislodges bone and dust particles therefrom for downward movement onto the refuse pan.

Another object is to provide such a machine having power means for rotating the brushes at an optimum speed for meat cleaning.

These, together with further objects will become more fully apparent upon reference to the following description and accompanying drawings.

Figure 1:
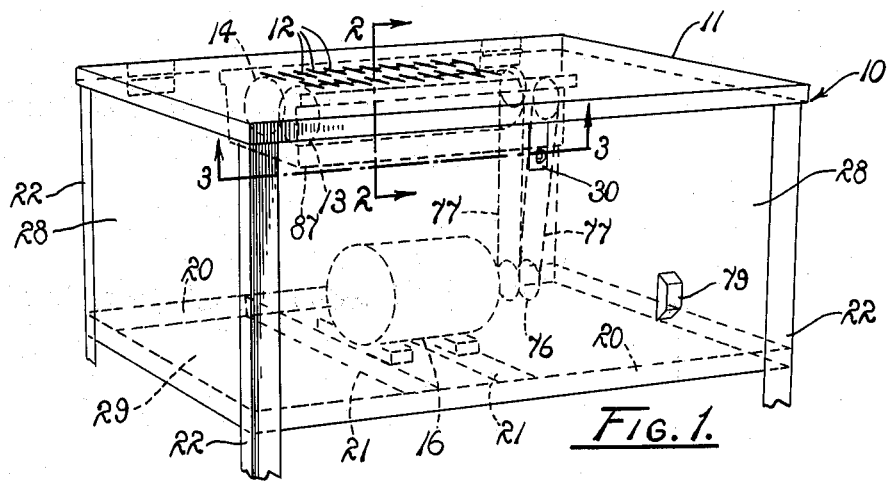
FIG. 1 is a perspective view of the meat cleaning machine of the present invention.

Referring more particularly to the drawings, the meat cleaning machine of the present invention is shown generally in FIG. 1 and consists of a support frame 10 having a hinged cover 11 with a series of slotted openings 12, a pair of shaft-mounted rotary brush members 13 and 14 disposed beneath the openings with their bristles 15 partially protruding therefrom and a motor 16 having driving connection to the brush members for rotating the same.

The frame 10 is an elongated rectangular structure formed of longitudinal beams 20 and transverse beams 21 connected by upright members 22. Stringers 23 may be extended between the beams for support of miscellaneous elements as necessary.

The frame 10 is preferably enclosed by wall panels 28 and a bottom panel 29 to form a secure housing. For working convenience it is held upright above a floor surface, not shown, by the upright members 22 extended to form legs.

The hinged cover 11 provides a polished planar surface suitable for the sliding of meat cuts thereacross in contact with the protruding bristles 15. It allows ready cleaning for the maintenance of maximum standards of sanitation. A suitable latch mechanism 30 allows the cover to be locked in a closed position.

Figure 5:
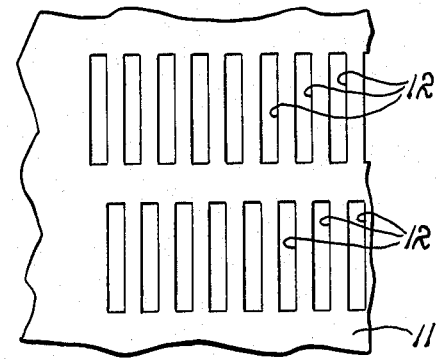
FIG. 5 is a schematic view of the slotted openings in the cover of the machine of FIG. 1.

The slotted openings 12 are uniformly spaced and disposed in parallel rows, as shown in FIG. 5, one row for each brush member. Each opening is registered with a single brush element 37, to be described, and is sized to accommodate the brush element to a selected height above the cover 11 as determined for optimum meat cleaning. As shown in FIG. 5, the openings are uniformly staggered to effect their registration with the spaces between openings in the adjacent row. The widths of the openings are preferably equal at least to the width of the spaces between openings so that when a cut of meat 38 is drawn completely across the openings in both rows no portion of its area is left unexposed to the protruding bristles.

Figure 3:
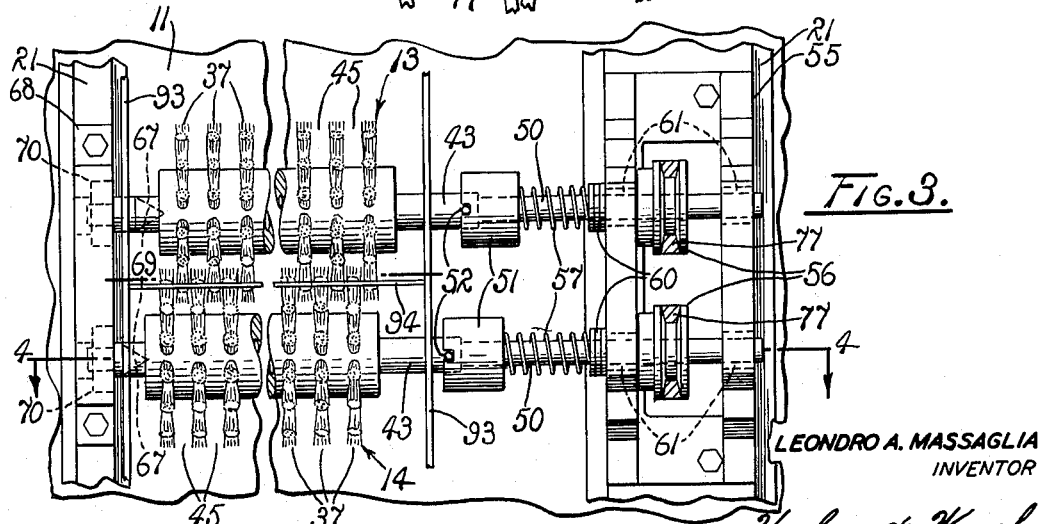
FIG. 3 is a fragmentary longitudinal horizontal section of the machine of FIG. 1 taken in a plane represented by line 3—3 of FIG. 1 and fragmentarily showing the refuse pan and brush mechanism support stringers.
Figure 4:
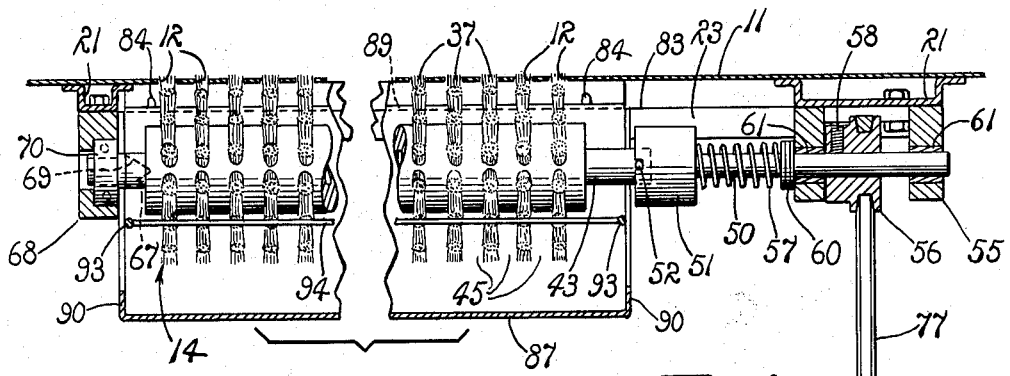
FIG. 4 is a fragmentary transverse vertical section of the meat cleaning machine of FIG. 3 taken in a plane represented by line 4—4 of FIG. 3.

Each brush member 12 and 14 consists of a plurality of elongated equisized bristle tufts 42 projecting radially from a central shaft or hub 43 and arranged in separate axially equispaced brush elements 37 disposed individually circumferentially in perpendicular relation to the shaft. The over-all brush arrangement of each member provides substantially a cylindrical brushing surface concentric with the shaft. The axial spacing 45 between brush elements is preferably sufficient to accommodate a brush element of the other brush member so that the two members may be disposed in peripherally radially overlapping juxtaposition with the brush elements of one member disposed between the elements of the adjacent member for free unobstructed movement therebetween, as shown in FIG. 3. Such spacing allows as close a juxtaposition of the two members as possible so that the coordinated brushing effect of the two members may be maximized.

The bristles 15 are formed of a suitable resilient material, such as nylon, and provide firm meat-brushing action thoroughly to clean the meat surface, without scarring or abrasion. The dimensions of each brush member relative to the cover openings 12 are such that its bristles extend above the cover member 11 to an extent which gives the most effective brushing action.

The brush members 13 and 14 are suspended from transverse beams 21 of the frame. One end of each brush member shaft 43 is secured to a separate rotary drive spindle 50 through a socket clutch 51 adapted to receive the end of the shaft and a suitable locking pin 52 securing the shaft in the socket.

The drive spindles 50 are mounted in cantilevered two-point journalled suspension by a single inverted pillow block 55 mounted in depending relation on a transverse beam 21. Integral with each spindle is a belt pulley 56 disposed between the journals and locked in place by a set screw 58. A compression clutch spring 57 is mounted on each spindle between the socket clutch 51 and an end thrust bearing 60 and serves to urge the spindle into firm engagement with the corresponding brush member shaft 43. Each spindle is slidable within its bearings 61 so that it may be pushed away from the brush member shaft against the force of the spring to allow removal of the brush members as required.

The opposite end of each shaft 43 is held in suspension by a rotary center 67 mounted in a second inverted pillow block 68. The pillow block is suspended from a transverse beam 21 by bolted connections or the like. The center and the shaft end form male and female surfaces 69 respectively, preferably conical in shape. The center is journalled in the block by means of a ball bearing 70. With the brush members 13 and 14 in position for rotation the springs 57 force the shafts into gripping contact with the centers for rotation integrally therewith.

The electric motor 16 is mounted on transverse beams, not shown, beneath the brush members and provides a drive pulley 76 aligned with the drive spindle pulleys 56 overhead. A pair of endless drive belts 77 connect the motor drive pulley to the respective spindle pulleys effectively to transmit a uni-directionally rotational force to the brush members. The motor drive pulley rotates preferably in a clockwise direction as viewed in FIG. 2 so that the brush members rotate as shown therein. The speed of rotation of the motor is such that when the brush bristles 15 project the proper distance above the cover 11 through the slotted openings 12, the rotating brush elements 37 forcefully and effectively clean refuse particles from the surface of the meat 38 without disfiguring or scarring the meat. The motor is conveniently controlled by a knee-operated switch 79.

Figure 2:
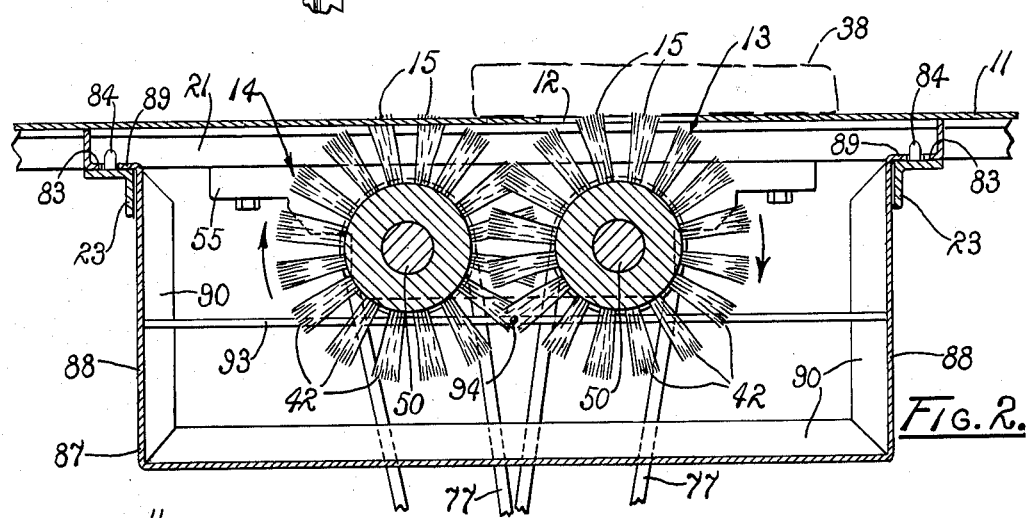
FIG. 2 is a fragmentary transverse vertical section of the machine of FIG. 1 taken in a plane represented by line 2—2 of FIG. 1 and fragmentarily showing the brush mechanism support stringers.

A pair of stringers 23 extend between the beams 21 supporting the pillow blocks 55 and 68. The stringers may be formed of elongated angle members providing a flat upper surface 83, as shown in FIG. 2. They are spaced an equal distance on opposite sides of the brush members 13 and 14. A suitable pin 84 is provided in at least one location along the upper surfaces of the stringers to serve as an alignment pin.

A refuse pan 87 having side walls 88 with lipped upper edges 89 is disposed beneath the brush members with its lipped edges seated on the stringers 23. The pan forms a rectangularly-shaped receptacle the side walls of which preferably extend upward to abut against the bottom surface of the cover 11. The end portions of the pan may extend upwardly to form end walls, not shown, which are necessarily cut to fit around the shafts and the centers. However, the abbreviated end walls 90 shown in FIG. 2 function entirely satisfactorily. The lipped edges provide sufficient apertures in registry with the alignment pins to accommodate the pins and maintain the pan in effective alignment.

Across each open end portion of the pan 87 extends a rigid rod 93 secured to the abbreviated end walls 90 by welding or the like. A wire 94 or rod of suitable durability is attached at its ends to the respective midpoints of the end rods and extends tautly therebetween. When the brush members 13 and 14 and the pan are in operational position, the wire extends the entire length of the brush members in symmetrically subjacent relation to the shafts 43 and in scraping engagement with the brushing surfaces.

The pan 87 is readily removable from its position under the brush members for cleaning purposes. After removing the brushes in the manner mentioned above the pan is extracted simply by lifting it off the support stringers 23. After cleaning it is as readily replaceable for further operation.

*Operation*

The operation of the described embodiment of the subject invention is believed to be clearly apparent and is briefly summarized at this point. In operation the cover 11 is closed and latched and this top surface is cleaned preparatory to receiving fresh meat. The motor 16 is activated and the brush members 13 and 14 commence to rotate. The cuts of meat 38 to be cleaned for marketing are then individually drawn across the slotted openings 12 allowing the rotating brush elements 37 to contact all surfaces of the meat. The meat cuts may be moved across the rotating brushing surfaces at any angle and may be held in desired alignment by means of an adjustable guide fence, not shown. It is noteworthy that when a cut of meat is drawn across the brushes perpendicularly of the shafts 43, no portion of the downwardly disposed meat surface is left unbrushed. This is due to the fact that the slotted openings and brush elements are aligned as shown in FIGS. 3 and 5.

During the cleaning operation the brush members discharge all refuse particles such as bone, bone marrow and fat dust downward onto the refuse pan 87. As the brushing surfaces brush pass the cleaning wire 94, particles adhering to the bristles 15 are dislodged for downward displacement onto the pan. The interaction of adjacent rotating bristles enhances this dislodgement. Thus, all the refuse is gathered for convenient disposal and the surrounding work area is kept in a sanitary condition.

After a period of operation it becomes necessary to dispose of the collected refuse. This is conveniently and readily accomplished by first turning off the motor 16, then raising the cover 11, removing the brush members by compressing the clutch springs 57 and finally removing the pan 87 for emptying of refuse and for cleaning.

It can be readily seen that a meat cleaning machine has been provided affording effective brushing action across the entire extent of a cut of meat without leaving gaps of uncleaned area. The machine provides a wire member for cleaning refuse from the bristles of the brushing members for downward displacement onto a refuse pan. The refuse pan may be readily removable for cleaning purposes. The bristles of the brush members protrude above the slotted openings a selected distance and rotate at a speed which affords the most effective cleaning of the entire surface of the cuts of meat.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A meat cleaning machine comprising a support frame having a substantially flat-topped cover member; a pair of brush members each comprising an elongated shaft and a plurality of brush elements each mounted in circumscribing relation on the shaft, said brush elements each having radial bristles forming a resilient peripheral brushing surface of a predetermined axial width, said elements being disposed perpendicular to the shaft in parallel substantially equally spaced planes of orientation and being spaced apart distance at least equal to the axial width of the individul peripheral brushing surfaces, the shafts of said brush members being mounted on the support frame for rotational movement, the shafts being disposed respectively in coextensively adjacent substantially parallel spaced relation, said brush elements of each member being disposed individually in interplanar radially overlapping relation between the brush elements of the adjacent member for free relative movement therebetween, said shafts being elevationally positioned so that the brush elements protrude a predetermined uniform segmental height above the cover member, said cover member providing spaced slotted openings adapted in combination to accommodate the respective brush elements when projecting a predetermined segmental height above the cover member, powered means mounted on the frame and connected to the shafts, said powered means being adapted to rotate the brush members at a predetermined speed, said brush members cooperating during rotation effectively and efficiently to clean the entire surface of successive cuts of meat being drawn across the cover member in contact with the projecting brushing surfaces; an elongated brush cleaning member mounted on the frame parallel to the shafts and subjacent thereto, said cleaning member being disposed in bristle-cleaning engagement with the peripheral brushing surfaces of both brush members and cooperating with the bristles effectively to dislodge refuse particles from the brush elements; and a refuse pan removably mounted on the support frame beneath the brush elements and adapted to be removed for cleaning.

2. A meat cleaning machine comprising a support frame having a substantially flat-topped cover member; a pair of substantially equisized brush members each comprising an elongated shaft and a plurality of brush elements each mounted in circumscribing relation on the shaft, said brush elements each having elongated radial bristles forming a resilient peripheral brushing surface of a predetermined axial width, said elements being disposed perpendicular to the shaft and in parallel substantially equally spaced planes of orientation spaced apart a distance at least equal to the axial width of the individual peripheral brushing surfaces, said brush elements in combination respectively on each brush member providing a substantially cylindrical brushing surface, the shafts of said brush member being mounted on the support frame for rotational movement, said shafts being adapted to be removed from the frame, the shafts being disposed respectively at the same elevation in coextensively adjacent substantially parallel horizontal spaced relation, said brush elements of each member being disposed individually in interplanar radially overlapping relation between the brush elements of the adjacent member for free relative movement therebetween, said shafts being elevationally positioned so that the brush elements protrude a predetermined uniform segmental height above the cover member, said cover member providing spaced slotted openings disposed in two parallel spaced rows with the openings registered individually with the respective spaces between openings in the opposite row and adapted in combination to accommodate the respective brush elements when projecting a predetermined uniform segmental height above the cover member; powered means mounted on the frame and connected to the shafts, said powered means being adapted to rotate the brush members at a predetermined speed, said brush members cooperating during rotation effectively and efficiently to clean the entire surface of successive cuts of meat being drawn across the cover member in contact with the projecting brushing surfaces; an elongated brush cleaning wire mounted on the frame parallel to the shafts and subjacently midway therebetween, said cleaning wire being disposed in resilient bristle-cleaning engagement with the peripheral brushing surfaces of both brush members and cooperating with the bristles effectively to dislodge refuse particles from the brush elements; at least two elongated support members mounted horizontally on the frame, said members being disposed in parallel spaced relation, said members being disposed at least at an elevation above the shafts and in spaced relation outwardly of the brush elements; and a substantially rectangular refuse pan having oppositely outwardly projecting upper lips each adapted to seat on a support member, said pan being supported between the support members and beneath the brush members, said pans extending along the entire axial extent of the brush elements and providing substantially upright sides surrounding the brush elements to a height at least higher than the shafts, said pan being adapted to receive and collect all refuse discharged from the brush elements and said pan being separately removable from the frame upon removal of the brush members.

3. In a machine for cleaning the surfaces of meat and the like, the combination of a pair of substantially cylindrical brushes, each brush having a hub and sets of bristles radially extended from the hub in planes normal to the axis of the hub, said sets being of a common thickness axially of their respective hubs and being spaced substantially the same distance as their respective thickness; means mounting the brushes in substantially parallel relation with the sets of bristles of each brush radially overlapping the sets of bristles of the opposite brush and extended into the spaces therebetween; means rotating the brushes; a cleaning wire tensioned in substantially parallel relation to the brushes in bristle engagement at a position downwardly spaced from alignment between the axes of the brushes; and a substantially flat-topped cover supported above said brushes and providing openings for accommodating the respective sets of bristles up to a predetermined distance above the top of said cover, said cover being adapted to support meat and the like during movement of the meat thereacross in cleaning contact with the brushes.

4. A meat cleaning machine comprising a support frame having a substantially flat removable cover; a pair of substantially cylindrical brushes each having a hub and sets of bristles radially extended from the hub in planes normal to the axis of the hub, said sets being of a common thickness axially of their respective hubs and being spaced substantially the same distance as their respective thickness; means mounting the brushes on the frame beneath the cover in substantially parallel relation with the sets of bristles of one brush offset axially from the respective corresponding sets of bristles of the opposite brush a distance substantially equal to said common thickness of the sets, said cover providing openings in registry with the respective sets of bristles of the brushes, said cover including portions spanning the openings effectively to support meat being drawn across the openings, said bristles projecting a predetermined distance through the openings and above the cover; means for rotating the brushes at a predetermined rotational speed; elongated brush cleaning means mounted on the frame in substantially parallel relation to the brushes in scraping engagement with the bristles at a position downwardly spaced from alignment between the axes of the brushes; and refuse collection means disposed on the frame subjacently of the brushes.

5. A meat cleaning machine as defined in claim 4 wherein the brushes overlap and the sets of bristles of each brush extend axially across their respective spaces between the sets of bristles of the opposite brush.

References Cited by the Examiner

UNITED STATES PATENTS

| 1,646,701 | 10/1927 | Moe | 15—3.16 |
| 2,799,877 | 7/1957 | Scott | 15—3.1 |
| 2,826,772 | 3/1958 | Smith | 15—3.17 |
| 2,932,042 | 4/1960 | Scott | 15—3.17 |

FOREIGN PATENTS

| 944,470 | 11/1948 | France. |

CHARLES A. WILLMUTH, *Primary Examiner.*

EDWARD L. ROBERTS, *Assistant Examiner.*